Patented Feb. 24, 1931

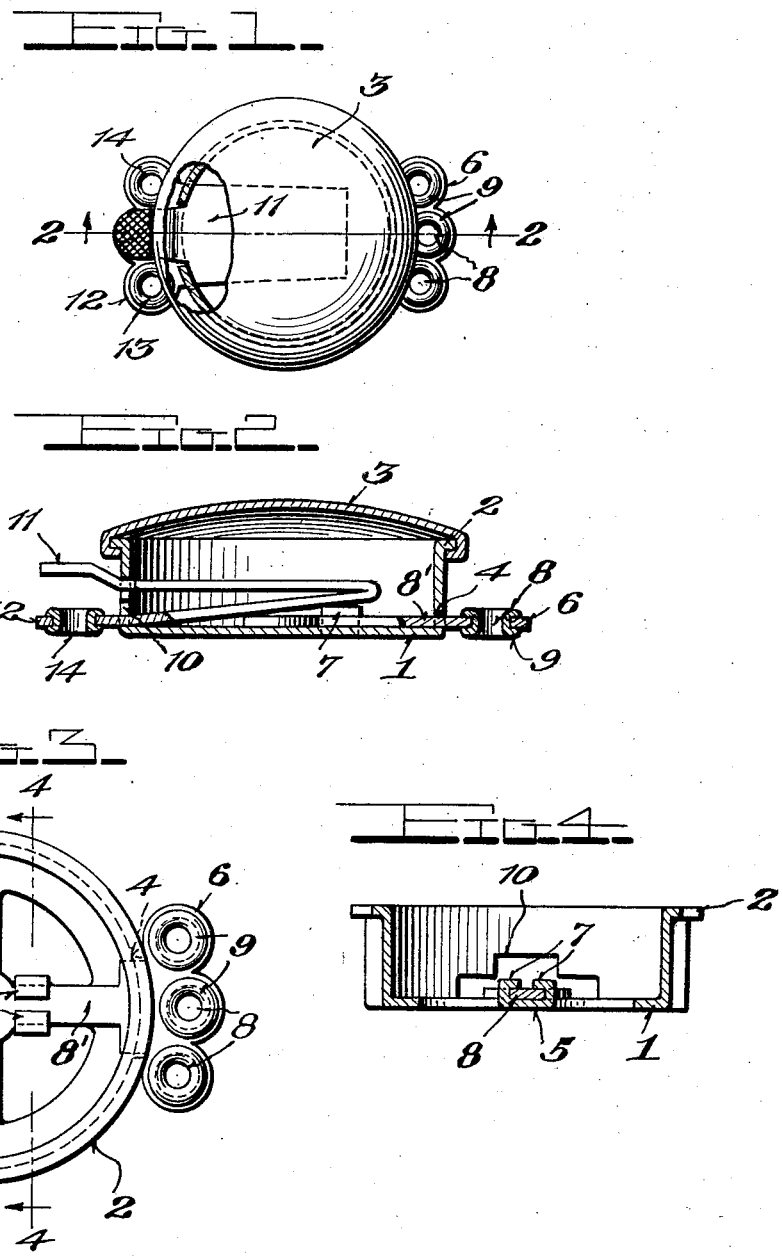

1,794,333

UNITED STATES PATENT OFFICE

GASTON A. GUYOT, OF ATTLEBORO, MASSACHUSETTS, ASSIGNOR TO GUYOT BROTHERS CO. INC., OF ATTLEBORO, MASSACHUSETTS

SNAP CATCH

Application filed June 23, 1930. Serial No. 463,234.

This invention relates to certain new and useful improvements in snap catches, and more particularly to catches employed in connection with a series of strings of beads or chains or the like, and the primary object thereof is to provide a catch which has novel means for connecting the ends of a series of beads or chains thereto.

Further the invention aims to provide a device of this character wherein the parts are of a simple and economical construction and can be easily and quickly assembled.

In the drawings:—

Figure 1 is a top plan view of the invention partly broken away and in section;

Figure 2 is a section on line 2—2 of Figure 1;

Figure 3 is a bottom plan view, the catch being removed; and

Figure 4 is a section on line 4—4 of Figure 3.

In proceeding in accordance with the present invention a hollow cup-like casing 1 is provided, the bottom of which is formed with segmental openings thereby to provide a series of arms 5 which radiate from the center of the bottom.

The top of the casing is flanged outwardly at 2 and has a cover plate 3 secured thereover. The rim of the casing is provided with a slot or aperture 4 in register with one of the arms 5 and through which projects the head portion of a T-shaped member 6. The said arm is provided with bendable extensions 7 at its opposite side edges, and which are bent over the shank 8' of member 6, to clamp same against the said arm 5 thereby to rigidly secure the member in position. The head of the member is provided with a series of openings 8 which latter have reinforcing eyelets 9 secured or clinched thereto and to which the ends of the beads or chains are anchored. The casing 1 further has its rim formed with an aperture 10 through which projects the arms of a spring catch member 11. The member 11 likewise has a head 12 formed with openings 13 and reinforcing eyelets 14 as described in connection with the head of the member 6.

From the foregoing it will be seen that the member 6 can be easily and quickly secured in position and is firmly held by virtue of the extension 7 and the end walls of the slot 4 in the rim of the casing. Further the structure presents a neat and symmetrical appearance, and one which is of very simple and economical character eliminating the use of solder or like securing means as is obvious.

Having thus described my invention what I claim as new and desire to secure by Letters Patent is:—

1. In a snap catch, a hollow casing having an apertured rim and a bottom formed with arms which radiate from its center and one of which has its sides formed with bendable extensions, a substantially T-shaped member having its shank extending through one of the apertures of the rim and seated on said arm, said extensions being bent over said shank to rigidly secure same, a snap member extending through another aperture of the rim, said snap member and the head of the T-shaped member each having a plurality of openings, and reinforcing eyelets extending through the openings and clinched into engagement with said members.

2. In a snap catch, a hollow casing having an apertured rim and having a bottom formed with an arm, spaced bendable extensions on the sides of the arm, a substantially T-shaped member having its shank extending through one of the apertures of the rim and seated on said arm, said extensions being bent over said shank to rigidly secure same to the casing, and a snap member extending through another aperture of the rim, said members having openings to receive the end of a chain or the like.

3. In a snap catch, a hollow casing having an apertured rim and a bottom formed with arms which radiate from its center and one of which has its sides formed with bendable extensions, a substantially T-shaped member having its shank extending through one of the apertures of the rim and seated on said arm, said extensions being bent over said shank to rigidly secure same, and a snap member extending through another aperture of the rim, said snap member and the head of the T-shaped members each having a plurality of openings.

4. In a snap catch, a hollow casing having an apertured rim and having a bottom provided with a pair of spaced bendable parts, a member having a shank extending through one of the apertures of the rim, said parts being bent over the shank to rigidly hold same in the casing and against the casing bottom, and a snap member extending through another aperture of the rim, said members having openings to receive the end of a chain or the like.

5. In a snap catch, a hollow casing having an apertured rim and having a bottom provided with a pair of spaced bendable parts, a member having a shank extending through one of the apertures of the rim, said parts being bent over the shank to rigidly hold same in the casing and against the casing bottom, and a snap member carried by the casing and which together with the member has chain receiving openings.

In testimony whereof I have hereunto signed by name.

GASTON A. GUYOT.